United States Patent [19]

Evans et al.

[11] Patent Number: 4,604,319
[45] Date of Patent: Aug. 5, 1986

[54] THERMOPLASTIC INTERLEAFED RESIN MATRIX COMPOSITES WITH IMPROVED IMPACT STRENGTH AND TOUGHNESS

[75] Inventors: Robert E. Evans, Trumbull, Conn.;
Kevin R. Hirschbuehler, Bel Air, Md.

[73] Assignee: American Cyanamid Company, Stamford, Conn.

[21] Appl. No.: 616,540

[22] Filed: Jun. 1, 1984

[51] Int. Cl.[4] ............................................. B32B 5/12
[52] U.S. Cl. .................................. 428/290; 428/113; 428/114; 428/294; 428/334; 428/335; 428/413; 428/414; 428/473.5; 428/902
[58] Field of Search ............... 428/29, 334, 335, 113, 428/114, 294, 902, 413, 414, 473.5

[56] References Cited

U.S. PATENT DOCUMENTS

| | | | |
|---|---|---|---|
| 2,561,449 | 7/1951 | Ruderman | 154/43 |
| 2,810,674 | 10/1957 | Madden | 154/140 |
| 3,010,848 | 11/1961 | Rochas | 117/126 |
| 3,472,730 | 8/1969 | Frigstad | 161/144 |
| 3,528,950 | 8/1970 | Lubowitz | 260/78.4 |
| 3,649,435 | 3/1972 | Varlas | 161/156 |
| 3,745,149 | 7/1973 | Serafini et al. | |
| 3,755,061 | 8/1973 | Schurb | 161/143 |
| 3,914,494 | 8/1975 | Park | 428/247 |
| 4,166,170 | 8/1979 | St. Clair | 528/229 |
| 4,182,495 | 1/1980 | Borgmeier et al. | 239/265 |
| 4,233,258 | 11/1980 | St. Clair | 264/137 |
| 4,309,473 | 1/1982 | Minamisawa et al. | 428/292 |
| 4,343,843 | 8/1982 | Johnson et al. | 428/36 |
| 4,356,230 | 10/1982 | Emanuel et al. | 428/290 |

FOREIGN PATENT DOCUMENTS

| | | |
|---|---|---|
| 1017612 | 1/1966 | United Kingdom . |
| 1024288 | 3/1966 | United Kingdom . |
| 1182377 | 2/1970 | United Kingdom . |

Primary Examiner—Marion C. McCamish
Attorney, Agent, or Firm—William H. Calnan

[57] ABSTRACT

High-performance fiber resin matrix composites are disclosed which are comprised of a first layer comprising reinforcing filaments coated with a thermosetting resin composition and a discrete second layer of a thermoplastic resin. When the composite layers are matched to provide certain minimum strength and elongation properties, composites of unusually high impact strength and resistance to impact damage are achieved which retain their high performance properties over a range of temperatures and environmental exposures.

20 Claims, 4 Drawing Figures

THERMOPLASTIC INTERLEAFED RESIN MATRIX COMPOSITES WITH IMPROVED IMPACT STRENGTH AND TOUGHNESS

FIELD OF THE INVENTION

This invention relates to interleafed fiber resin matrix materials. More particularly, the invention relates to reinforced, interleafed fiber resin matrix composites having improved resistance to impact damage and improved interlaminar toughness.

RELATED APPLICATIONS

This application is related to the following commonly-assigned pending U.S. Patent Applications

| Serial No. | Filed | Applicants |
|---|---|---|
| 518,871 | Aug. 1, 1983 | Krieger, Jr., Hirschbuehler and Politi |
| 572,263 | Jan. 19, 1984 | Krieger, Jr., Hirschbuehler and Politi |
| 595,314 | March 30, 1984 | Hirschbuehler and Stern |

BACKGROUND OF THE INVENTION

High strength to weight materials constructed from fiber resin matrix composites have become widely used in many industries where strength, corrosion resistance and light weight are desirable. For example, resin matrix materials are particularly well suited for use in aircraft structural members. Sporting equipment, such as tennis racquets and golf clubs, has also been successfully constructed from such materials.

Fiber resin matrix composites are typically comprised of a dense layer of strong reinforcing filaments coated with a thermoset resin to form a curable sheet or tape. The composite can then be formed to desired shapes and cured. Numerous reinforced resin matrix composites have been described in the art, of which U.S. Pat. Nos. 2,561,449 (Ruderman), 2,810,674 (Madden), 3,010,848 (Rochas et al), 3,649,435 (Varlas), 3,755,061 (Schurb), 3,914,494 (Park), 4,182,495 (Borgmeier et al), 4,309,473 (Minamisaway et al), 4,343,843 (Johnson et al) and 3,472,730 (Frigstad) and British Pat. No. 1,182,377 are representative.

It is known that composite laminates can be improved by interleafing thermoset films between the fiber-reinforced layers. In the Frigstad patent, U.S. Pat. No. 3,472,730, for example, filament-reinforced resinous sheeting is disclosed which comprises a thin layer of high-strength filaments coated with a heatcurable resin composition and a separate exterior film on at least one side of the filament-reinforced layer comprising a heat-curable resin composition modified with a resin that contains elastomeric material. In the above-mentioned Krieger et al. applications, Ser. Nos. 518,871 and 572,263, it is disclosed that employing interleaf resins comprising a thermosetting epoxy resin modified with 8–70% by weight of a rubbery vinyl addition polymer such that the shear modulus is greater than 50,000 psi and yield strength is greater than 3,000 psi at high temperatures provide fiber resin matrix composites having greatly improved resistance to impact damage over a wide range of temperatures. In the above-mentioned Hirschbuehler et al. application, Ser. No. 595,314, it is disclosed that lightweight woven cloths (scrims) can be used in thermoset interleafed fabric resin matrix composites to improve the impact resistance of composites reinforced by high-strength woven fabrics.

SUMMARY OF THE INVENTION

It has now been discovered that certain resin composites comprising alternating layers of a filament-reinforced thermosetting resin, called a fiber resin matrix layer, and of a thermoplastic resin, called an interleaf resin layer, show greatly improved compression strength after impact without reduction in mechanical properties at elevated temperatures. Furthermore, by matching the fiber matrix resin and the thermoplastic interleaf resin components according to this invention to minimize diffusion and migration during cure, high-strength, impact-resistant composites may be achieved which show marked improvement over known materials.

Accordingly, it is an object of the present invention to provide an interleafed fiber resin matrix composite that provides improved toughness and impact resistance over known prior art resin matrix materials, while maintaining mechanical properties over a wide range of temperatures and environmental exposures.

It is a further object of the present invention to provide an interleafed fiber resin matrix composite that exhibits improved shear resistance over a wide range of temperatures.

It is a further object of the present invention to provide an interleafed fiber resin matrix composite wherein the interleaf resin layer forms a strong adhesivetype bond with the fiber resin matrix layer, while remaining a discrete resin layer.

These and other objects are accomplished herein by an interleafed fiber resin matrix composite which comprises:

(A) a fiber resin matrix layer comprising (i) high-strength reinforcing filaments, preferably about 60%–70% by weight, and (ii) a thermosetting resin composition, preferably about 30%–40% by weight, coating said filaments, and (B) a discrete interleaf resin layer comprising a thermoplastic resin, adhesively bondable to the fiber resin matrix layer, wherein said thermosetting resin composition (A)(ii) exhibits shear modulus of at least 50,000 psi at high temperatures under wet conditions, and said interleaf resin (B) exhibits shear modulus above 50,000 psi and a yield strength above 3000 psi at high temperatures. Preferably the glass transition temperature, $T_g$, of the thermoplastic resin is relatively high, e.g., above about 140° C., to provide thermal stability at upper use temperatures.

For the purposes of the present inventions, the term "high temperatures" and "upper use temperatures" refers to temperatures in and above a range of from about 180° F. to over 400° F. The term "wet conditions" refers to a test condition where the sample to be tested has been immersed in water at 160° F. for 14 days, or to any environmental exposure to moisture that produces a like condition. The term "thermoplastic resin" refers to a resin which is wholly thermoplastic as well as to thermoplastic/thermosetting resin blends wherein the thermosetting component is a minor constituent of the blend, present in an amount of no more than 40% by weight, based on the weight of the blend.

DESCRIPTION OF THE PREFERRED EMBODIMENTS

The present invention is directed to the provision of a laminate layer referred to as an interleaf for use in a composite structure of a fiber resin matrix and the interleaf.

The fundamental discovery underlying the present invention is that a resin having particular mechanical properties, when used to provide thin, discrete layers between fiber-reinforced layers of a fiber resin matrix composite, results in a composite having unique toughness, shear resistance, and resistance to impact damage, and these properties are maintained at elevated temperatures, e.g., up to 270° F., and even higher. This performance is achieved by pairing a matrix resin having particular high-temperature properties and a thermoplastic interleaf resin having adhesive bonding properties, a relatively high glass transition temperature and a relatively high strain to failure to form a composite structure of alternating fiber resin matrix and interleaf resin layers.

The invention further resides in use of thermoplastic materials as particular interleaf materials, making possible fiber resin matrix and interleaf resin composites of superior toughness.

Figure 4:
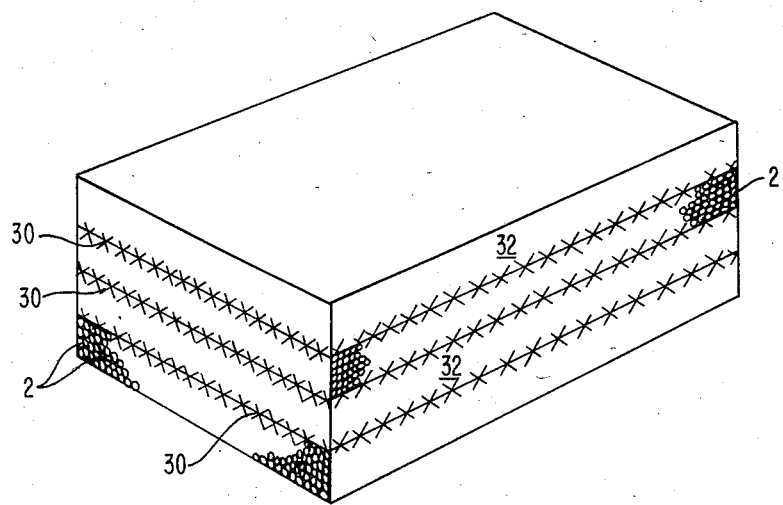
FIG. 4 is a portion of a stack of composites, illustrating (with exaggerated crosses) the desirable area of adhesive bonding between the discrete layers in cured composites according to the present invention.

It is particularly significant in this invention that the interleaf material comprises a thermoplastic material, that it contains at most a minor portion of thermosetting materials and that the interleaf resin and the resin of the fiber resin matrix are sufficiently compatible to form an adhesive bond at the resin interface. On a microscopic level, there may be an extremely thin layer 30 at the matrix resin/interleaf resin interface, characteristic of adhesive-type bonding, where the thermoplastic interleaf material dissolves slightly in the matrix resin; however, aside from this bonding interface, the interleaf material must be capable of maintaining a discrete interleaf layer, and no general intermixing of the interleaf layer and resin matrix layer occurs (FIG. 4).

The interleafed composites of the present invention exhibit high compression, tensile and flexural strengths as well as the ability to withstand impact damage. The interleafed composites of the present invention show greater toughness, greater resistance to shear impact, greater tolerance of impact damage and greater resistance to crack propagation than conventional fiber resin matrix composites. With respect to state-of-the-art thermosetting interleafs, thinner thermoplastic films surprisingly are equivalent to thicker thermosetting films, with respect to their toughness. With conventional thermosetting interleafs, it is not possible to employ interleaf thicknesses below about 0.001 inch without significant loss of toughness of the composite, however the thermoplastic interleaf in the present invention may be utilized at such low thicknesses, e.g., on the order of 0.0005 inch, without adverse effect on toughness properties.

The dynamic relationship between the fiber resin matrix component and the interleaf resin component of the present composites is complex, however in general the interleaf resin provides toughness, i.e., high impact strength, to the composite at all temperatures, while the matrix resin is highly resistant to the effects of wet conditions and changes in temperature. The interleaf resin layers are also designed to protect the fiber matrix layers by absorbing damaging forces before they reach levels harmful to the fiber resin matrix. When subjected to shear forces, for instance, the interleaf materials suitable for the purposes herein show great elongation above a certain shear stress level, and the components are paired so that the interleaf resin layer will flex and absorb the energy of the shear load as it approaches a level at which the fiber resin matrix will fail. If impact loads reach such levels that the structure cracks, the high strain capabilities of the interleaf layer help to maintain the integrity of the structure by increasing the energy required to drive cracks through the laminate. In this way crack propagation, even after damage, is curtailed; and by selecting the components to provide this sort of interprotective relationship, highperformance composites can be achieved.

Figure 1:
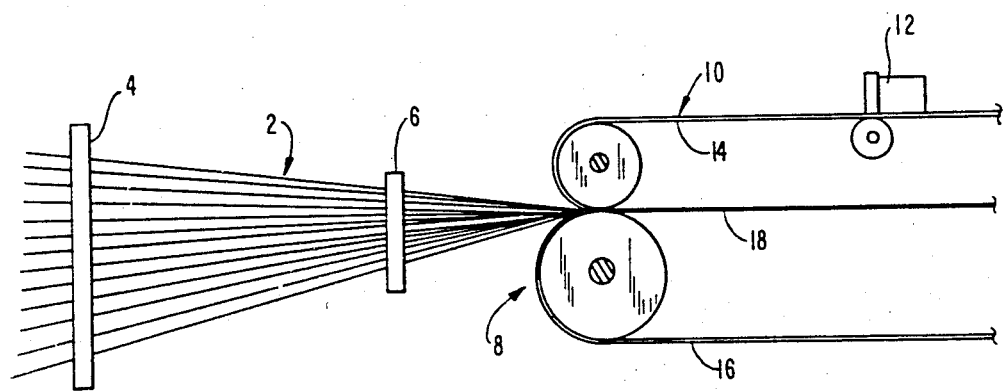
FIG. 1 is a schematic of the process of preparing a fiber resin matrix composite of the present invention.

As seen in FIG. 1, the basic fiber matrix material may be produced by delivering reinforcing filaments 2 through conventional eye-boards 4 and 6 to a pressure roller assembly 8. The curable thermosetting resin composition (matrix resin) is coated in a layer 10 from a conventional film coating applicator 12 onto a substrate such as release paper 14 and passed through the pressure roller assembly 8. Release paper 16 is also delivered to the pressure roller assembly 8.

The pressure rollers 10 are set at a temperature and pressure for imbedding the fibers 2 in the resin layer 10 to form a fiber resin matrix 18. Practice has taught that a temperature in the range of 190° F. and pressures of one thousand pounds over a fifteen inch center are suitable for producing a fiber resin matrix 18.

The fibers 2, the substrate 14 with resin layer 10 and the release paper 16 are delivered to the pressure rollers 8 and passed therethrough at the rate of 3–20 feet/minute.

Figure 2:
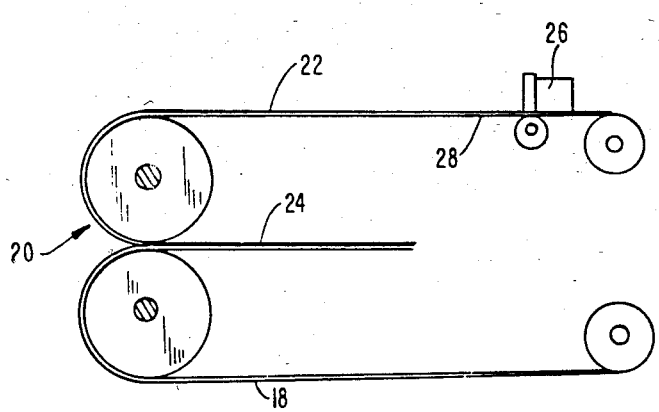
FIG. 2 is a schematic of a process for providing a thermoplastic interleafing material on a fiber resin matrix in accordance with this invention.

The feed of fiber 2 and resin layer 10 to the pressure rollers 8 is selected to produce a fiber resin matrix of about 30–40 weight percent (preferably 34 weight percent) resin and about 60–70 weight percent (preferably about 66 weight percent) fiber. For example, 120 filaments of 6K carbon fibers are delivered within a twelve inch width to the pressure rollers 8 with a layer of resin 0.013 to 0.018 pounds per square foot. The resulting fiber resin matrix 18 is thus reinforced by a closely packed array of filaments. Thereafter, as shown in FIG. 2, the release paper on one side of the fiber resin matrix 18 is removed and the fiber resin matrix is passed through another set of pressure rollers 20 for the application of the interleaf material 22 to the fiber resin matrix 18.

A layer of interleaf material 22 is typically extruded (by hot melt extrusion), or cast out of solvent, onto a carrier 28, cooled or dried, then laminated with the fiber resin matrix 18 through pressure rollers 20. The interleaf material 22 is deposited to provide an interleaf layer of about 0.0004 to 0.004 inches thickness. The exposed surface of the fiber resin matrix 18 is presented to the interleaf material 22 and the two are joined by the inherent adhesive nature of the matrix resin 18. The interleaf material is essentially thermoplastic and virtually without any adhesive characteristics.

Figure 3:
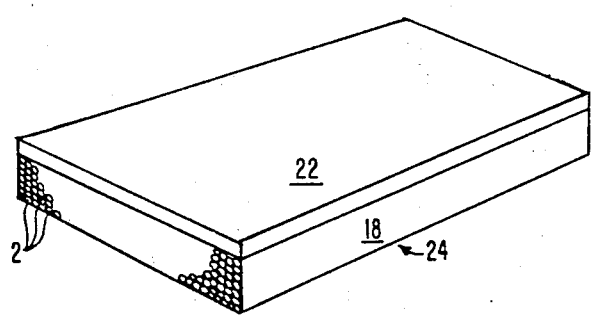
FIG. 3 is an enlarged cross-sectional view of the thermoplastic interleafed fiber resin matrix tape of the subject invention.

An interleafed fiber resin matrix composite 24 is thus produced and appears as shown in FIG. 3.

The reinforcing filaments useful in the present invention include, but are not limited to, filaments comprised of glass, carbon, graphite, silicon carbide, boron, aramid, polyester, polyamide, rayon, polybenzimidazole, polybenzothiazole, metal-coated such filaments, for example nickel-coated and/or silver-coated graphite fibers and filaments, or combinations of such filaments. In applications demanding a high strength to weight ratio or shear strength, carbon fibers, graphite filaments, polyaramid filaments or nickel-plated graphite filaments, such as disclosed in commonly assigned, copending application Ser. No. 358,637, are preferred.

Thermosetting resin compositions potentially useful as the matrix resin in the present invention include epoxy, polyimide, bis maleimide and acetyleneterminated resins.

Epoxy resin compositions useful to coat the reinforcing filaments as the matrix resin therefor may suitably comprise epoxy compounds having more than one epoxide group per molecule available for reaction. Such epoxy prepolymers include, but are not limited to, polyfunctional ethers of polyvalent phenols, for example pyrocatechol; resorcinol; hydroquinone; 4,4'-dihydroxydiphenyl methane; 4,4'-dihydroxy-3,3'-dimethyldiphenyl methane; 4,4'-dihydroxydiphenyl dimethyl methane; 4,4'-dihydroxydiphenyl methyl methane; 4,4'-dihydroxydiphenyl cyclohexane; 4,4'-dihydroxy3,3'-dimethyldiphenyl propane; 4,4'-dihydroxydiphenyl sulphone; or tris-(4-hydroxyphenyl) methane; polyglycidyl ethers of the chlorination and bromination products of the above-mentioned diphenols; polyglycidyl ethers of novolacs (i.e., reaction products of monohydric or polyhydric phenols with aldehydes, formaldehyde in particular, in the presence of acid catalysts); polyglycidyl ethers of diphenols obtained by esterifying 2 mols of the sodium salt of an aromatic hydroxycarboxylic acid with 1 mol of a dihalogenoalkane or dihalogen dialkyl ether (see, U.K. No. 1,017,612); and polyglycidyl ethers of polyphenols obtained by condensing phenols and long-chain halogen paraffins containing at least 2 halogen atoms (see, U.K. No. 1,024,288).

Other suitable compounds include polyepoxy compounds based on aromatic amines and epichlorohydrin, for example N,N'-diglycidylaniline; N,N'-dimethyl-N,N'-diglycidyl-4,4'-diaminodiphenyl methane; N-diglycidyl-4-aminophenyl glycidyl ether; N,N,N',N'-tetraglycidyl-4,4'-diaminodiphenyl methane; and N,N,N',N'-tetraglycidyl-1,3-propylene bis-4-aminobenzoate, the latter two compounds being most preferred.

Glycidyl esters and/or epoxycyclohexyl esters or aromatic, aliphatic and cycloaliphatic polycarboxylic acids, for example phthalic acid diglycidyl ester and adipic ester diglycidyl and glycidyl esters of reaction products of 1 mol of an aromatic or cycloaliphatic dicarboxylic acid anhydride and ½ mol of a diol or 1/n mol of a polyol with n hydroxyl groups, or hexahydrophthalic acid diglycidyl esters, optionally substituted by methyl groups, are also suitable.

Glycidyl ethers of polyhydric alcohols, for example of 1,4-butanediol; 1,4-butenediol; glycerol; 1,1,1-trimethylol propane; pentaerythritol and polyethylene glycols may also be used. Triglycidyl isocyanurate; and polyglycidyl thioethers of polyvalent thiols, for example of bis mercaptomethylbenzene; and diglycidyltrimethylene sulphone, are also suitable.

The epoxy resin composition will also include a curing agent for the epoxy resin. Such curing agents are well known to those skilled in the art, and preferred curing agents for the purposes herein will be diamines, including, but not limited to, diaminodiphenyl sulphone, diaminodiphenyl methane, phenylenediamine, etc.

The amount of curing agent necessary for a particular application can be readily determined by persons skilled in the art and will vary according to the precise makeup of the resin composition, the curing conditions desired and other factors. However, by way of illustration, where a diamine curing agent is employed, from about 20 to 40 weight percent, most preferably about 27 to 31 weight percent, based on the total epoxy resin, has been found suitable.

Polyimides potentially useful as matrix resins in the practice of the present invention include the polyimides disclosed in U.S. Pat. Nos. 3,528,950; 3,745,149; 4,233,258; and 4,166,170.

Bis maleimide resins which may be employed as the matrix resin include bis maleimides based on the following monomers:

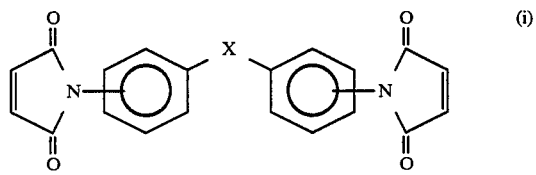

(i)

wherein the isomeric species are meta, meta; meta, para or para, para and

X=—CH$_2$—, —O—, —S—, or

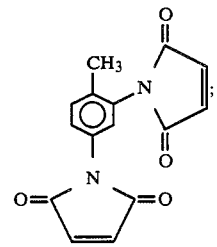

(ii)

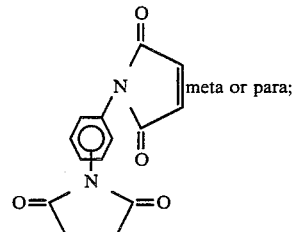

(iii)

-continued

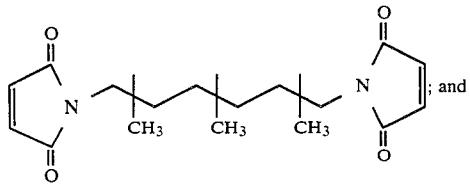

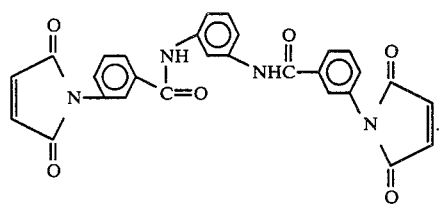

Acetylene-terminated resins which may be utilized as the matrix resin include resins based on the following monomers:

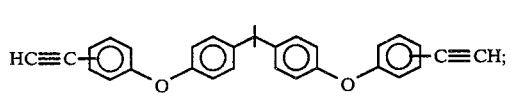

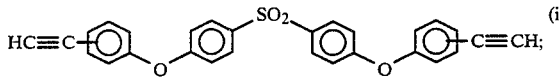

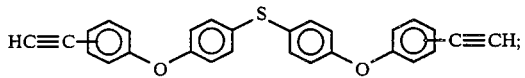

and

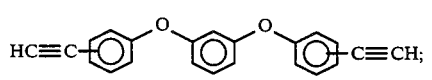

wherein the —C≡CH substituents each independently may be meta- or para - positioned.

Fillers, dyes, pigments, plasticizers, curing catalysts and other such conventional additives and processing aids may be added to the thermosetting resin compositions described herein before curing to influence the properties of the final resin composite.

The thermoplastic resin of the interleaf comprises a high molecular weight engineering thermoplastic, much as a polyester, a polyamide, a polyaramid, a polyarylate, a polycarbonate, a poly(ester carbonate), a polybenzimidazole, a polyimide, a polyether imide, a polyamide imide, and the like. Preferably the thermoplastic will be a polyether ether ketone, abbreviated PEEK (ICI), a polyimide, e.g., KAPTON ® (DuPont), or a polyether imide, e.g., ULTEM ® (General Electric). As indicated, the thermoplastic resin may contain a minor amount (up to 40% by weight) of a thermosetting resin, which may for example be of the same composition as the matrix resin, as may be necessary or desirable in a given application to achieve suitable solvent resistance or other material properties of the interleaf. In addition, it may be advantageous in the practice of the present invention to utilize reinforcing materials in the interleaf, such as mat scrim, whiskers, particulates, chopped fibers or other second phase reinforcement, and in general the reinforcing material may suitably be employed in various amounts, such as for example up to about 50% by weight based on the total weight of the interleaf.

It has been discovered that in order to provide the unique advantages of the present invention, the thermosetting resin compositions, that is, the matrix resin (which coats the reinforcing filaments), and the interleaf resin must exhibit specific properties. The matrix resin, when tested "neat", or without reinforcement, must show a minimum stiffness when subjected to shear forces, especially at high temperatures and under wet conditions. The matrix resin must have a shear modulus of at least 90,000 psi under hot, dry conditions, e.g., when subjected to shear at 180° F.-270° F., or a shear modulus of at least 50,000 psi under hot, wet conditions, e.g., when subjected to shear at 180° F.-270° F. after soaking in water at 160° F. for 14 days. It is also necessary that the matrix resin have a shear modulus above about 100,000 at room temperature and extremely low temperatures, i.e., −67° F., however, this is ordinarily the case where the modulus at 180°-200° F. is as high as 50,000 psi. Preferred matrix resin compositions will show an initial shear modulus of 90,000 psi or above under hot, wet conditions, and will show an initial shear modulus of 130,000 psi or above at room temperature and low temperatures. The most preferred thermosetting resins for use as a matrix resin will also exhibit high strength, for example an ultimate stress over 3000 psi, most preferably 5000 psi or above.

The interleaf resin must also exhibit a minimum initial shear modulus, and in addition the interleaf resin must show elongation above a minimum stress. This initial modulus is believed to transfer loads between the layers of the reinforcing fibers without large deformation of the structure. For the purposes herein, the interleaf material must have an initial shear modulus above 50,000 psi at high temperatures, preferably above 90,000 psi at 180° F.-270° F. At room temperature the initial shear modulus for the interleaf should be at least about 100,000 psi (preferably at least 130,000 psi), and at −67° F. the shear modulus should be at least about 130,000 psi (preferably at least 150,000 psi); however, as with the matrix resin, such values at room temperature and low temperatures would be expected with high shear modulus at elevated temperatures. Most preferably, the interleaf resin will be slightly soluble in the uncured or partially cured thermosetting matrix resin at temperatures used to form the composites. This aids in providing adhesive bonding at each interface. The interleaf resin must, of course, also be able to survive the curing temperatures, usually about 350° F., that the composites are subjected to.

The interleaf resin shows an initial rigidity (high modulus) when subjected to shear but at a certain level of shear stress, shows elongation (high ultimate strain). The point at which the resin begins to show high elongation in response to stress is the "yield strength" of the resin, and for the purposes herein, this must be at least about 3000 psi at high temperatures. Most preferred interleaf resins will have a room temperature yield strength of at least about 6000 psi and a high temperature yield strength of at least about 5000 psi.

DESCRIPTION OF THE PREFERRED EMBODIMENTS

The invention is illustrated by the following examples, but the claims are not to be construed as being limited thereto.

EXAMPLE 1

A matrix resin according to the present invention was made according to the following formulation:

| | parts by weight |
|---|---|
| tetra(4,4′)N—glycidyl methylene dianiline (Ciba Geigy Araldite ® MY-720) | 80 |
| tetraglycidoxy tetraphenylethane (Shell Epon ® 1031) | 20 |
| trimethylene glycol di-para-aminobenzoate (Polaroid Polacure ® 740 M) | 44 |
| fumed silica $(SiO_2)_2$ (Cabot Cab-o-Sil ® M-5) | 6 |
| reaction product of toluene diisocyanate and dimethylamine | 1 |

A fiber resin matrix was formed by coating the above formulation on a layer of collimated graphite fibers. Composites were formed as shown in FIG. 3, by applying to the aforementioned fiber resin matrix an interleaf film, approximately 0.0005 inches thick, of a polyether polyimide (ULTEM ®), which was cast out of solvent. The thermoplastic interleaf resin formed a discrete layer adjacent to the fiber resin matrix having an adhesive bond at the interface between the two layers.

Composites were stacked and autoclave cured at 350° F. and 100 psi for 2 hours to produce a structural part. Stacks of eight plies, all arranged with collimated fibers, i.e., extending in the same direction (0°), were prepared for the Unidirectional Compresion Strength, or UNI-COMP, test. Stacks of sixteen plies with the fibers oriented equally at 0°, 90° and ±45° were prepared for the Quasi-isotropic Compression Strength, or QUASI-COMP, test. Stacks of thirty-six plies with the fibers oriented at relative angles of 0°, 90° and ±45° were prepared for the Compression Strength After Impact, or COMP/IMPACT, test. The laminates exhibited the following properties:

| Temp. (°C.) | UNI-COMP (KSI) | QUASI-COMP (KSI) | COMP/IMPACT (1500 in-lbs/in) |
|---|---|---|---|
| 23° | 181.4 | 97.2 | 51,000 |
| 93° | 163.5 | 83.8 | — |
| 132° | 130.0 | 68.7 | — |

In practice, the interleaf material can be used to form a variety of different parts. For example, cover structures for airplane parts may be formed of fiber resin matrix-interleaf sheets stacked and cured to form 0.10-inch to 0.25-inch thin structural parts. Structural members such as wing panels will be much thicker.

Fiber resin matrix-interleaf sheets according to this invention range in thickness from 0.0005 to 0.010 inch, thus, for example, a stack of twenty-five to fifty fiber resin matrix-interleaf sheets will form a ¼-inch thick part. The fiber resin matrix-interleaf sheets are typically stacked with the direction of the fibers oriented in different directions, depending on the stress requirements of the part. For example, the maximum number of fiber resin matrix-interleaf sheets may be oriented in the 0° direction, i.e., the direction in which the maximum tension or compression forces will be imposed, and the remainder of the fiber resin matrix-interleaf sheets are oriented at 90° and plus or minus 45° from the 0° orientation.

The relative thickness of the layers of the fiber resin matrix-interleaf resin sheet is also important. Preferably the interleaf layer will be in the range of about 0.0004 in. to 0.002 in., and the fiber resin matrix layer will be in the range of about 0.007 in. to 0.009 in.

EXAMPLE 2

A fiber resin was prepared using the following matrix resin formulation:

| | parts by weight |
|---|---|
| tetra (4,4′)N—glycidyl methylene dianiline (Ciba Geigy Araldite ® MY-720) | 100 |
| trimethylene glycol di-para-aminobenzoate (Polaroid Polacure ® 740 M) | 48.4 |
| PKHH phenoxy resin based on epichlorohydrin and bis phenol A (Union Carbide Corporation) | 10 |
| boron trifluoride-monoethyl amine $(BF_3.MEA)$ | 0.5 |

Composites were formed by applying an extruded polyether polyimide (ULTEM ®) layer 0.001 inch thick. Laminates were formed, cured and tested as in Example 1, and the following data were obtained:

| Temperature (°C.) | Compression Strength QUASI-COMP (KSI) |
|---|---|
| 23° | 89 |
| 93° | — |
| 132° | 88 ± 4 |
| 177° | 62 |

The laminates also exhibited a Critical Strain Energy Release Rate, $G_{Ic}$, of 3.15 in-lbs/sq in; and Short Beam Shear Strength (unidirectional) of 13.1±0.4 KSI. A similar laminate showed a short beam shear strength (Quasi-isotropic) of 12.2 KSI.

EXAMPLE 3

A fiber resin matrix was prepared using CYCOM ® 1806 (American Cyanamid Company) as the matrix reisn.

Composites were prepared having a 0.001-inch interleaf layer of the same polyether polyimide resin used in Example 2. Laminates were formed, cured and tested as in Example 2, and the following data were obtained: $G_{Ic}$, 2.0 in-lbs/sq in; edged delamination strain, 0.77%; and Short Beam Shear Strength (Unidirectional) of 13.0±1.1 KSI. Microscopic examination showed good bonding of the interleaf to the matrix resin with no interfacial failure.

EXAMPLE 4

A matrix resin having the following composition was prepared:

| | parts by weight |
|---|---|
| tetra (4,4′)N—glycidyl methylene dianiline (Ciba Geigy Araldite ® MY-720) | 100 |
| ULTEM ® polyether polyimide resin (General Electric Company) | 10 |
| trimethylene glycol di-para-aminobenzoate (Polaroid Polacure ® 740M) | 46 |

Composites were prepared having a 0.001-inch interleaf layer of the same polyether polyimide used in Example 2. Laminates prepared from the composites exhibited a Compression Strength After Impact of 48.0±3 KSI.

EXAMPLE 5

A fiber resin matrix was prepared using CYCOM ® 1808 (American Cyanamid Company) as the matrix resin.

Composites were prepared having a 0.002-inch interleaf layer of a polyether-ether ketone (PEEK) which had been degreased with methylene chloride to remove any surface soil or lubricant therefrom. Laminates exhibited a $G_{Ic}$ of 1.23 in-lbs/sq in. Microscopic examination showed good bonding of the interleaf to the matrix resin with no interfacial failure.

EXAMPLE 6

Composites formed using the matrix resin of Example 5 and having a 0.0005-inch interleaf layer of polyamide (KAPTON ®) washed with methylene chloride were prepared. Laminates formed from the composites had a $G_{Ic}$ of 2.05 in-lbs/sq in. Microscopic examination showed good bonding of the interleaf to the matrix resin with no interfacial failure.

EXAMPLE 7

Composites were prepared as in the previous examples having a bis(maleimide) matrix resin and a 0.001-inch interleaf layer of polyether polyimide (Example 2). Laminates formed from the composites had a $G_{Ic}$ of 1.38 in-lbs/sq in. Microscopic examination showed good bonding of the interleaf to the matrix resin with no interfacial failure.

EXAMPLE 8

Composites identical to those of Example 7, except that the interleaf layer was 0.0005 inch thick were prepared. Laminates prepared from the composites showed a $G_{Ic}$ of 1.43 in-lbs/sq in; an edged delamination strain of 0.48%; and Compression Strength After Impact of 31.4 KSI.

EXAMPLE 9

Fabric resin matrix composites formed by impregnating a woven graphite fiber fabric with the resin of Example 5 and applying a 0.001-inch interleaf layer of a polyether polyimide (ULTEM ®) were prepared. Laminates prepared from the composites showed a $G_{Ic}$ of 1.36 in-lbs/sq in. Similar composites having a light weight non-woven polyester scrim placed between the interleaf and fiber resin matrix layers (in order to improve the fracture toughness of the composite) were prepared and formed into laminates which exhibited a $G_{Ic}$ of 3.02 in-lbs/sq in.

EXAMPLES 10-15

The matrix resin denoted hereinbelow in Table I as Resin A had the following composition:

|  | parts by weight |
|---|---|
| tetra (4,4')N—glycidyl methylene dianiline (Ciba Geigy Araldite MY-720) | 100 |
| diamino diphenyl sulfone | 38 |
| ULTEM ® polyether polyimide resin (General Electric Company) | 10 |
| reaction product of phenyl isocyanate and N,N'—diethyl-1,3-diamino propane | 1.4 |

Six additional fiber resin matrix composites were prepared to further illustrate the advantage of the present invention. All composites employed CELION ® 6K graphite filaments and had a matrix resin content of approximately 34%. The matrix resin and interleaf resin combinations were as follows:

TABLE I

| Sample | Matrix Resin | Interleaf |
|---|---|---|
| 10 | [CYCOM ® 985]* | — |
| 11 | [Same as Example 1] | — |
| 12 | [Same as Example 1] | Modified epoxy** |
| 13 | [Same as Example 1] | ULTEM ® |
| 14 | Resin A | — |
| 15 | Resin A | ULTEM ® |

*A commercial fiber resin matrix material, sold by American Cyanamid Company.
**A thermoset epoxy resin modified with a carboxylicfunctional butadiene-acrylonitrile copolymer (See aforementioned U.S. Patent Application Serial No. 572,263).

The composites were formed into laminates and subjected to UNI-COMP, QUASI-COMP and COMP-/IMPACT tests, as described above, with the results shown in Table II below.

TABLE II

|  | Sample | | | | | |
|---|---|---|---|---|---|---|
|  | 10 | 11 | 12 | 13 | 14 | 15 |
| UNI-COMP (KSI) | | | | | | |
| RT | 235 | 205 | 146 | 181 | 223 | 173 |
| 200° F. | 235 | 205 | 129 | 164 | 197 | 166 |
| 270° F. | — | 200 | — | 130 | 208 | 163 |
| 200° F. Wet | 168 | 125 | 90 | 147 | 143 | 158 |
| 270° F. Wet | — | 52 | — | 46 | 102 | 107 |
| QUASI-COMP (KSI) | | | | | | |
| RT | 104 | 97 | 88 | 97 | 101 | 96 |
| 200° F. | 103 | 96 | 75 | 84 | 102 | 80 |
| 270° F. | — | 100 | — | 69 | 100 | 72 |
| 200° F. Wet | 77 | 66 | 63 | 71 | 86 | 76 |
| 200° F. Wet | — | 36 | — | 38 | 68 | 60 |
| COMP/IMPACT (1500 in-lbs/in) | 28.3 | 31.7 | 43.4 | 51.0 | 32.3 | 49.3 |

Considering the foregoing data in detail, it is seen that Sample 12, comprising a modified epoxy interleaf as disclosed in U.S. Patent Application Ser. No. 527,623, exhibits a 137% improvement in impact resistance (compressive strength after impact) relative to Sample 11 containing no interleaf (Sample 12=43.4; Sample 11=31.7), with both Samples 11 and 12 affording improvement over the conventional fiber resin matrix composites of Sample 10. The improvement in impact resistance achieved by Sample 12 over Sample 11, however, is realized at a sacrifice in elevated temperature compressive strength and compressive strength under high humidity conditions, especially with regard to uniaxial compressive strength (see, for example, at 200° F. wet conditions, the compressive strength of Sample 12 is 90 KSI, while the corresponding value for Sample 11 is 125 KSI).

Sample 13, illustrative of the present invention, shows an improvement in compressive stength after impact of 161%, with little change in compressive strength at either 200° F. or 270° F., dry or wet, compared to the unmodified laminate of Sample 11.

Samples 14 and 15 show the effect of using a thermoplastic interleaf in a high stiffness formulation designed to provide superior strength at a 270° F., wet condition. The utilization of the interleaf (Sample 15) does not significantly change either uniaxial or quasiisotropic compressive strength (within the experimental error of the test) relative to the unmodified laminate (Sample 14), yet improves the compression strength after impact from 32.3 to 49.3, an improvement of 153%.

EXAMPLES 16-21

Samples 116-21 were prepared with the same matrix resin as Example 1 and in accordance with the procedure of Example 1 except for the interleaf, which was varied as follows:

| | |
|---|---|
| Sample 16: | no interleaf |
| Sample 17: | same as Example 12 (thermoset epoxy modified with butadiene-acrylonitrile copolymer) |
| Sample 18: | same as Example 13 (wholly thermoplastic) |

| | parts by weight |
|---|---|
| Sample 19: interleaf formulation - | |
| ULTEM ® polyether polyimide (General Electric Company) | 300 |
| Dow Dev 331 (Dow Chemical Company), a diglycidyl ether of bis phenol A | 80 |
| diamine diphenyl sulfone | 16 |
| dicyandiamide | 4 |
| Sample 20: interleaf formulation - | |
| ULTEM ® | 300 |
| Modified epoxy of Example 12 | 100 |
| Sample 21: interleaf formulation | |
| ULTEM ® | 300 |
| ERL-0500 (Ciba Geigy), trifunctional epoxy resin | 70 |
| diaminodiphenyl sulfone | 30 |

The interleafs of Sample 18-21 were cast on 0.005 lbs/ft² films from methylene chloride solution. All interleaf layers were dried for 1 hour at 200° F. prior to being formed into composites. The resulting composites were then each laid up in the form of 16-ply laminates with a quasi-isotropic sequence, and then tested by ASTM D2344, Short Beam Shear Test, with the results (quasi-SBS) as shown in Table III below.

TABLE III

| Quasi-SBS Data for Testing of Samples 16-21 by ASTM D2344 | | | | | | |
|---|---|---|---|---|---|---|
| | Sample | | | | | |
| | 16 | 17 | 18 | 19 | 20 | 21 |
| 200° F., Dry (control) | 9.4 | 9.6 | 10.2 | 11.0 | 11.5 | 11.5 |
| 200° F., 5 weeks Wet | 5.7 | 5.9 | 6.0 | 6.7 | 7.0 | 6.7 |
| 200°F., 5 weeks in Methylene Chloride | 7.2 | 4.9 | delaminated | 7.6 | 3.1 | 2.3 |

The above data of Table III show that the solvent resistance (to methylene chloride) of the thermoplastic interleaf-containing composite (Sample 18) is markedly echanced by combining the thermoplastic resin (ULTEM ®) with 25% by weight of a thermosetting resin (including curative) as in Sample 19-21. The unmodified thermoplastic interleaf laminate totally delaminated after one week in methylene chloride, while the thermoplastic/thermoset interleaf materials (Samples 19-21) retained 20% to 70% of their 200° F., dry short beam strength values after 5 weeks exposure and 34% to 100% of their corresponding 200° F., 5 weeks wet SBS values.

The patents and publications referenced herein above are incorporated herein by reference.

Many variations of the invention will suggest themselves to those skilled in this art in light of the above detailed description, and all such variations are within the full intended scope of this invention. For example, other filaments, such as carbon, silicon carbide, boron, aramid, polyester, polyamide, and rayon, or metal-coated, such as nickel- and/or silver-coated such filaments and fibers, alone or in any combination, can be used.

Matrix resin formulations also can be varied in weight ratio widely, depending on the precise properties desired and the intended use. By way of illustration, a preferred matrix resin according to this invention may have the following components, in the following proportions, by weight:

| | parts by weight | |
|---|---|---|
| Ingredients | Preferred | Most Preferred |
| (i) tetra (4,4') N—glycidyl dianiline | 50-100 | 75-85 |
| (ii) tetraglycidoxy tetraphenylethane | 0-50 | 15-25 |
| (iii) trimethylene glycol di-para-aminobenzoate | 28-60 | 35-45 |
| (iv) fumed silica | 0-12 | 5-7 |
| (v) reaction product of toluene diisocyanate and dimethylamine | 0.1-2.5 | 0.1-2.5 |

All such obvious variations are within the full intended scope of the invention as defined by the appended claims.

We claim:

1. An interleafed fiber resin matrix composite which comprises:
   (A) a fiber resin matrix layer comprising (i) high-strength reinforcing filaments and (ii) a thermosetting resin composition coating said filaments, and
   (B) a discrete interleaf resin layer comprising (i) a thermoplastic resin, adhesively-bondable to said fiber resin matrix layer, wherein said thermosetting resin composition (A)(ii) exhibits shear modulus of at least 90,000 psi at high temperatures or at least 50,000 psi at high temperatures under wet conditions, and said interleaf resin (B) exhibits shear modulus of at least 50,000 psi and a yield strength of at least 3000 psi at high temperatures.

2. An interleafed fiber resin matrix composite as defined in claim 1 wherein said reinforcing filaments are selected from the group consisting of glass, carbon, graphite, silicon carbide, boron, aramid, polyester, polyamide, rayon, polybenzimidazole, and polybenzothiazole filaments, and metal-coated such filaments.

3. An interleafed fiber resin matrix composite as defined in claim 1 wherein a bonded interface is formed between layer (A) and layer (B).

4. An interleafed fiber resin matrix composite as in claim 1 wherein the thermosetting resin composition (A)(ii) is comprised of epoxy compounds selected from the group consisting of polyglycidyl ethers of polyfunctional phenols, polyglycidyl ethers of the chlorination or bromination products of polyvalent phenols, polyglycidyl ethers of novolacs, polyepoxy compounds derived from aromatic amines and epichlorohydrin, and mixtures thereof.

5. An interleafed fiber resin matrix composite as defined in claim 4 wherein said thermosetting resin composition (A)(ii) and said interleaf resin (B) both exhibit an ultimate shear stress above about 3000 psi.

6. An interleafed fiber resin matrix composite as defined in claim 4 wherein said thermosetting resin composition further includes curing agent(s).

7. An interleafed fiber resin matrix composite as defined in claim 6 wherein said curing agents are diamines.

8. An interleafed fiber resin matrix composite as defined in claim 7 wherein said diamines are selected from the group consisting of diaminodiphenyl sulphone, diaminodiphenyl methane, and phenylenediamine.

9. An interleafed fiber resin matrix composite as defined in claim 4 wherein the interleaf resin is selected from the group consisting of polyester, polyamide, polyaramid, polyarylate, polycarbonate, poly(ester carbonate), polybenzimidazole, polyimide, polyether imide, polyamide imide, polyether ether ketone, and mixtures of any of the foregoing.

10. An interleafed fiber resin matrix composite as defined in claim 9 wherein the interleaf resin is a polyether imide resin.

11. An interleafed fiber resin matrix composite as defined in claim 1, wherein said reinforcing filaments comprise about 60%–70% by weight of the fiber resin matrix and said thermosetting resin composition (A)(ii) comprises about 30%–40% by weight of the fiber resin matrix.

12. An interleafed fiber resin matrix composite as defined in claim 1, wherein said fiber resin matrix layer (A) has a thickness of approximately 0.007–0.009 in. and said interleaf resin layer (B) has a thickness of approximately 0.0004–0.002 in.

13. An interleafed fiber resin matrix composite as defined in claim 1, wherein said thermosetting resin composition comprises a resin selected from the group consisting of thermosetting epoxy, polyimide, bis maleimide and acetylene-terminated resins.

14. An interleafed fiber resin matrix composite as defined in claim 1, wherein said thermoplastic resin (B)(i) contains up to about 40 percent by weight of a thermosetting resin.

15. An interleafed fiber resin matrix composite as defined in claim 1, wherein said thermoplastic resin (B)(i) contains a reinforcing material.

16. An interleafed fiber resin matrix composite as defined in claim 1 wherein the thermosetting resin composition (A)(ii) is comprised of bis maleimide compounds selected from the group consisting of:

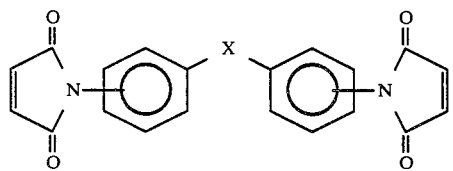

wherein
the isomeric species are meta, meta; meta, para or para, para and
X=—CH$_2$—, —O—, —S—, or

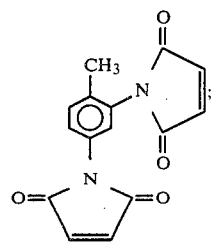

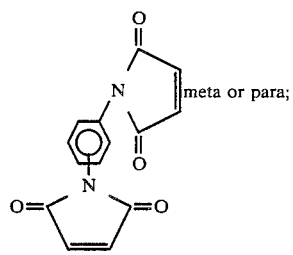

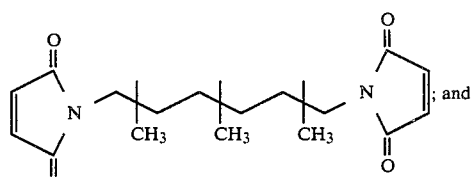

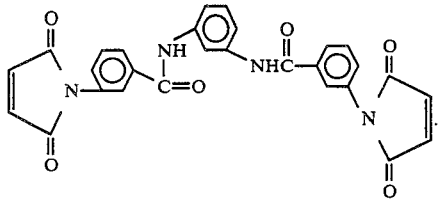

17. An interleafed fiber resin matrix composite as defined in claim 1, wherein the thermosetting resin composition (a) (ii) is comprised of acetylene-terminated resins selected from the group consisting of:

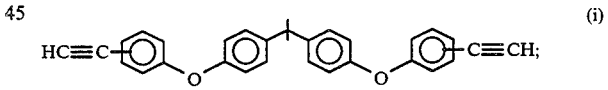

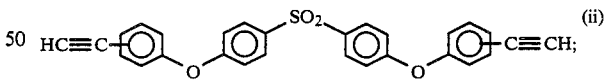

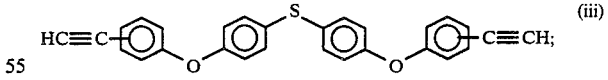

and

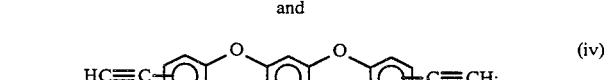

wherein the —C≡CH substituents each independently may be meta- or para - positioned.

18. An interleafed fiber resin matrix composite comprising:
(A) a fiber resin matrix comprising:
 (i) 60%–70% by weight high-strength reinforcing filaments selected from the group consisting of carbon fibers, graphite fibers, nickel-coated such fibers, silver-coated such fibers, nickel-and-silver-coated such fibers, and combinations thereof, and (ii) 30%–40% by weight of a thermosetting epoxy resin composition coating said filaments, said epoxy resin composition comprising:
  (a) a polyepoxide compound or combination of compounds,
  (b) a curing agent effective to catalyze polymerization of said polyepoxide compound, and
  (c) a filler; and (B) a discrete interleaf resin layer comprising: a thermoplastic resin, adhesively bondable to said fiber resin matrix layer, wherein said epoxy resin composition (A)(ii) exhibits shear modulus of at least 50,000 psi at high temperatures under wet condidtions, and said interleaf resin (B) exhibits shear modulus of at least 50,000 psi and a yield strength of at least 3000 psi at high temperatures, and sheer strain to failure of at least 6% at −67° F., at least 15% at room temperature and at least 25% at high temperatures.

19. An interleafed fiber resin matrix composite comprising:

(A) A fiber resin matrix layer comprising:
  (i) 60%–70% by weight high-strength reinforcing filaments selected from the group consisting of carbon fibers, graphite fibers, nickel-coated such fibers, silver-coated such fibers and nickel-and-silver-coated such fibers, and
  (ii) 30%–40% by weight of a thermosetting epoxy resin composition coating said filaments, said epoxy resin composition comprising:
    (a) 50-100 parts by weight of tetra(4,4')N-glycidyl methylene dianiline,
    (b) 0-50 parts by weight tetra-glycidoxy tetraphenylethane,
    (c) 28-60 parts by weight trimethylene glycol di-para-aminobenzoate,
    (d) 0-12 parts by weight fumed silica, and
    (e) 0.1-2.5 parts by weight of the reaction product of toluene iisocyanate and dimethylamine; and (B) A discrete interleaf resin layer comprising a thermoplastic polyether polyimide.

20. An interleafed fiber resin matrix composite which comprises:

(A) A fiber resin matrix layer comprising (i) 60%–70% by weight high-strength reinforcing filaments and (ii) 30%–40% by weight of a thermosetting resin composition coating said filaments, and (B) A discrete interleaf resin layer comprising a thermoplastic resin adhesively bondable to said fiber resin matrix layer, wherein said thermosetting resin composition (A)(ii), subjected to shear forces at 200° F., has an ultimate stress of at least 5000 psi, and wherein said interleaf resin (B), subjected to shear at 200° F. has a yield stress of at least 4000 psi, and an ultimate stress of at least 5000 psi

* * * * *

REEXAMINATION CERTIFICATE (2616th)
United States Patent [19]
Evans et al.

[11] B1 4,604,319
[45] Certificate Issued Jul. 4, 1995

[54] THERMOPLASTIC INTERLEAFED RESIN MATRIX COMPOSITES WITH IMPROVED IMPACT STRENGTH AND TOUGHNESS

[75] Inventors: Robert E. Evans, Trumbull, Conn.; Kevin R. Hirschbuehler, Bel Air, Md.

[73] Assignee: American Cyanamid Company, Stamford, Conn.

Reexamination Requests:
No. 90/002,288, Mar. 12, 1991
No. 90/002,491, Oct. 22, 1991
No. 90/002,780, Jul. 10, 1992
No. 90/003,070, May 25, 1993

Reexamination Certificate for:
Patent No.: 4,604,319
Issued: Aug. 5, 1986
Appl. No.: 616,540
Filed: Jun. 1, 1984

[51] Int. Cl.⁶ .................... B32B 5/12; B32B 5/14
[52] U.S. Cl. .................... 428/290; 428/113; 428/114; 428/294; 428/334; 428/335; 428/413; 428/414; 428/473.5; 428/902
[58] Field of Search .......... 428/290, 113, 114, 294, 428/334, 335, 413, 414, 423.5, 902

[56] References Cited
FOREIGN PATENT DOCUMENTS
51-58484 5/1976 Japan.
1299177 12/1972 United Kingdom.

Primary Examiner—Jenna Davis

[57] ABSTRACT

High-performance fiber resin matrix composites are disclosed which are comprised of a first layer comprising reinforcing filaments coated with a thermosetting resin composition and a discrete second layer of a thermoplastic resin. When the composite layers are matched to provide certain minimum strength and elongation properties, composites of unusually high impact strength and resistance to impact damage are achieved which retain their high performance properties over a range of temperatures and environmental exposures.

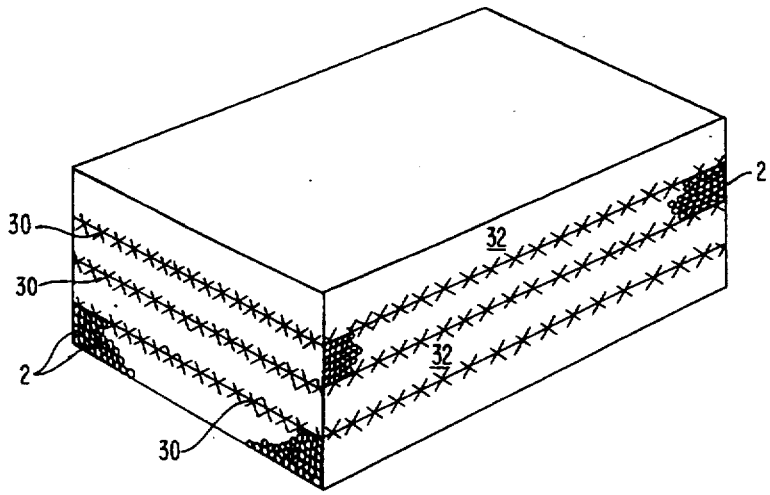

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 to 20 are determined to be patentable as amended.

New Claims 21 to 40 are added and determined to be patentable.

1. An *improved, high-strength structural member having enhanced compressive strength after impact, said member including an* interleafed fiber resin matrix laminate *comprising a plurality of composites, each said* composite *comprising* [which comprises]:
   (A) a fiber resin matrix layer comprising (i) high-strength reinforcing filaments and (ii) a thermosetting resin composition coating said filaments, and
   (B) a discrete interleaf resin layer, *having a maximum thickness of 0.001 inch,* comprising (i) a thermoplastic resin, adhesively-bondable to said fiber resin matrix layer, wherein said thermosetting resin composition (A) (ii) exhibits shear modulus of at least 90,000 psi at high temperatures or at least 50,000 psi at high temperatures under wet conditions, and said interleaf resin (B) exhbits shear modulus of at least 50,000 psi and a yield strength of at least 3000 psi at high temperatures.

2. An *improved structural member comprising an* interleafed fiber resin matrix *laminate including a plurality of composites, wherein each said composite is as defined in* claim 1, *and* wherein said reinforcing filaments are selected from the group consisting of glass, carbon, graphite, silicon carbide, boron, aramid, polyester, polyamide, rayon, polybenzimidazole, and polybenzothiazole filaments, and metal-coated such filaments.

3. An *improved structural member comprising an* interleafed fiber resin matrix *laminate including a plurality of composites, wherein each said composite is as defined in* claim 1, *and* wherein a bonded interface is formed between layer (A) and layer (B).

4. An *improved structural member comprising an* interleafed fiber resin matrix *laminate including a plurality of composites, wherein each said composite is as defined in* claim 1, *and* wherein the thermosetting resin composition (A) (ii) is comprised of epoxy compounds selected from the group consisting of polyglycidyl ethers of polyfunctional phenols, plyglycidyl ethers of the chlorination or bromination products of polyvalent phenols, polyglycidyl ethers of novolacs, polyepoxy compounds derived from aromatic amines and epichlorohydrin, and mixtures thereof.

5. An *improved structural member comprising an* interleafed fiber resin matrix *laminate including a plurality of composites, wherein each said composite is as defined in* claim 4, *and* wherein said thermosetting resin composition (A) (ii) and said interleaf resin (B) both exhibit an ultimate shear stress above about 3000 psi.

6. An *improved structural member comprising an* interleafed fiber resin matrix *laminate including a plurality of composites, wherein each said composite is as defined in* claim 4, *and* wherein said thermosetting resin composition further includes curing agent(s).

7. An *improved structural member comprising an* interfleafed fiber resin matrix *laminate including a plurality of composites, wherein each said composite is as defined in* claim 6, *and* wherein said curing agents are diamines.

8. An *improved structural member comprising an* interleafed fiber resin matrix *laminate including a plurality of composites, wherein each said composite is as defined in* claim 7, *and* wherein said diamines are selected from the group consisting of diaminodiphenyl sulphone, diaminodiphenyl methane, and phenylenediamine.

9. An *improved structural member comprising an* interleafed fiber resin matrix *laminate including a plurality of composites, wherein each said composite is as defined in* claim 4, *and* wherein the interleaf resin is selected from the group consisting of polyester, polyamide, polyaramid, polyarylate, polycarbonate, poly(ester carbonate), polybenzimidazole, polyimide, polyether imide, polyamide imide, polyether ether ketone, and mixtures of any of the foregoing.

10. An *improved structural member comprising an* interleafed fiber resin matrix *laminate including a plurality of composites, wherein each said composite is as defined in* claim 9, *and* wherein the interleaf resin is a polyether imide resin.

11. An *improved structural member comprising an interleafed fiber resin matrix laminate including a plurality of composites, wherein each said composite is as defined in* claim 1, *and* wherein said reinforcing filaments comprise about 60%–70% by weight of the fiber resin matrix and said thermoseting resin composition (A) (ii) comprises about 30%–40% by weight of the fiber resin matrix.

12. An *improved structural member comprising an* interleafed fiber resin matrix *laminate including a plurality of composites, wherein each said composite is as defined in* claim 1, *and* wherein said fiber resin matrix layer (A) has a thickness of approximately 0.007–0.009 in. and said interleaf resin layer (B) has a thickness of approximately 0.0004–[0.002] *0.001* in.

13. An *improved structural member comprising an* interleafed fiber resin matrix *laminate including a plurality of composites, wherein each said composite is as defined in* claim 1, *and* wherein said thermosetting resin composition comprises a resin selected from the group consisting of thermosetting epoxy, polyimide, bis maleimide and acetyleneterminated resins.

14. An *improved structural member comprising an* interleafed fiber resin matrix *laminate including a plurality of composites, wherein each said composite is as defined in* claim 1, *and* wherein said thermoplastic resin (B) (i) contains up to about 40 percent by weight of a thermosetting resin.

15. An *improved structural member comprising an* interleafed fiber resin matrix *laminate including a plurality of composites, wherein each said composite is as defined in* claim 1, *and* wherein said thermoplastic resin (B) (i) contains a reinforcing material.

16. An *improved structural member comprising an* interleafed fiber resin matrix *laminate including a plurality of composites, wherein each said composite is as defined in* claim 1, *and* wherein the thermosetting resin composition (A) (ii) is comprised of bis maleimide compounds selected from the group consisting of:

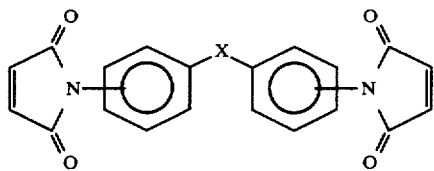

wherein
the isomeric species are meta, meta; meta, para or para, para and $$X = -CH_2-, -O-, -S-, \text{ or } -\overset{O}{\underset{\|}{C}}-;$$

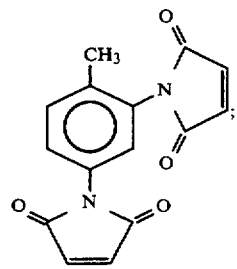

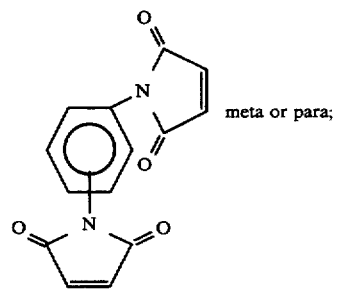

meta or para;

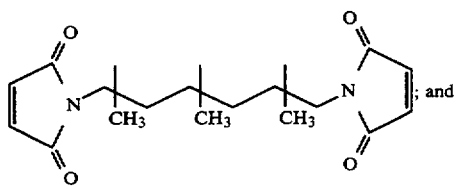
and

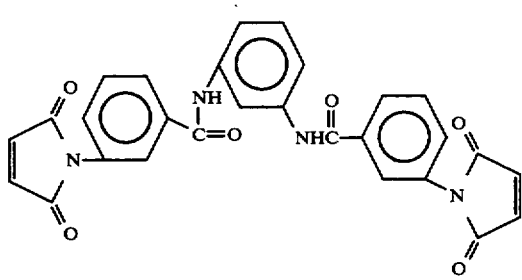

17. An *improved structural member comprising an interleafed fiber resin matrix laminate including a plurality of composites, wherein each said* composite *is* as defined in claim 1, *and* wherein the thermosetting resin composition [a] *A* ) (ii) is comprised of acetylene-terminated resins selected from the group consisting of:

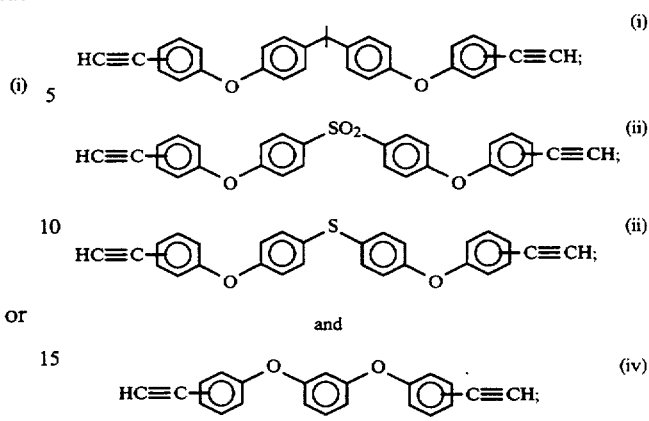

and wherein the —C≡CH substituents each independently may be meta- or para- positioned.

18. An *improved, high-strength structural member having enhanced compressive strength after imapct, said member including an* interleafed fiber resin matrix laminate-*comprising a plurality of composites, each said* composite comprising:

(A) a fiber resin matrix comprising:
(i) 60%-70% by weight high-strength reinforcing filaments selected from the group consisting of carbon fibers, graphite fibers, nickel-coated such fibers, silver-coated such fibers, nickel-and-silver-coated such fibers, and combinations thereof, and
(ii) 30%-40% by weight of a thermosetting epoxy resin composition coating said filaments, said epoxy resin composition comprising:
  (a) a polyepoxide compound or combination of compounds,
  (b) a curing agent effective to catalyze polymerization of said polyepoxide compound, and
  (c) a filler; and
(B) a discrete interleaf resin layer, *having a maximum thickness of 0.001 inch,* comprising: a thermoplastic resin, adhesively bondable to said fiber resin matrix layer, wherein said epoxy resin composition (A) (ii) exhibits shear modulus of at least 50,000 psi at high temperatures under wet [condiditions] *conditions,* and said interleaf resin (B) exhibits shear modulus of at least 50,000 psi and a yield strength of at least 3000 psi at high temperatures, and [sheer] shear strain to failure of at least 6% at −67° F., at least 15% at room temperature and at least 25% at high temperatures.

19. An *improved, high-strength structural member having enhanced compressive strength after impact, said member including an* interleafed fiber resin matrix *laminate comprising a plurality of composites, each said* composite comprising:

(A) [A] *a* fiber resin matrix layer comprising:
(i) 60%-70% by weight high-strength reinforcing filaments selected from the group consisting of carbon fibers, graphite fibers, nickel-coated such fibers, silver-coated such fibers and nickel-and-silver-coated such fibers, and
(ii) 30%-40% by weight of a thermosetting epoxy resin composition coating said filaments, said epoxy resin composition comprising:
  (a) 50-100 parts by weight of tetra (4,4')N-glycidyl methylene dianiline, (b) 0–50 parts by weight tetra-glycidoxy tetra-phenylethane,
(c) 28–60 parts by weight trimethylene glycol dipara-aminobenzoate,
(d) 0–12 parts by weight fumed silica, and
(e) 0.1–2.5 parts by weight of the reaction product of toluene [iisocyanate] diisocyanate and dimethylamine; and
(B) [A] a discrete interleaf resin layer, having a maximum thickness of 0.0001 inch, comprising a thermopostic polyether polyimide.

20. An improved, high-strength structural member having enhanced compressive strength after impact, said member including an interleafed fiber resin matrix laminate comprising a plurality of composites, each said composite comprising [which comprises]:
(A) [A] a fiber resin matrix layer comprising (i) 60%–70% by weight high-strength reinforcing filaments and (ii) 30%–40% by weight of athermosetting resin composition coating said filaments, and
(B) [A] a discrete interleaf resin layer, having a maximum thickness of 0.001 inch, comprising a thermoplastic resin adhesively bondable to said fiber resin matrix layer, wherein said thermosetting resin composition (A) (ii), subjected to shear forces at 200° F., has an ultimate stress of at least 5000 psi, and wherein said interleaf resin (B), subjected to shear at 200° F., has a yield stress of at least 4000 psi, and an ultimate stress of at least 5000 psi.

21. An improved structural member comprising an interleafed fiber resin matrix laminate including a plurality of composites, wherein each said composite is as defined in any one of claims 1 to 20, and wherein said high-strength reinforcing filaments (A) (i) in at least two of said composites are oriented in different directions relative to each other.

22. A fiber resin matrix composite for assembly into a multi-layered laminated structural member having enhanced compressive strength after impact upon curing, said composite comprising:
(A) a fiber resin matrix layer comprising (i) high-strength reinforcing filaments and (ii) a thermosetting resin composition coating said filaments, and
(B) a discrete interleaf resin layer, having a maximum thickness of 0.001 inch, comprising (i) a thermoplastic resin, adhesively-bondable to said fiber resin matrix layer, wherein said thermosetting resin composition (A) (ii) exhibits shear modulus of at least 90,000 psi at high temperatures or at least 50,000 psi at high temperatures under wet conditions, and said interleaf resin (B) exhibits shear modulus of at least 50,000 psi and a yield strength of at least 3000 psi at high temperatures, and wherein said interleaf resin (B) is selected from the group consisting of polyester, polyamide, polyaramid, polyarylate, polycarbonate, poly(ester carbonate), polybenzimidazole, polyimide, polyether imide, polyamide imide, polyether ether ketone, and mixture of any of the foregoing.

23. A fiber resin matrix composite, for assembly into a structural member, as defined in claim 22, wherein said reinforcing filaments are selected from the group consisting of glass, carbon, graphite, silicon carbide, boron, aramid, polyester, polyamide, rayon, polybenzimidazole, and polybenzothiazole filaments, and metal-coated such filaments.

24. A fiber resin matrix composite, for assembly into a structural member, as defined in claim 22, wherein a bonded interface is formed between layer (A) and layer (B).

25. A fiber resin matrix composite, for assembly into a structural member, as defined in claim 22, wherein the thermosetting resin composition (A) (ii) is comprised of epoxy compounds selected from the group consisting of polyglycidyl ethers of polyfunctional phenols, polyglycidyl ethers of the chlorination or bromination products of polyvalent phenols, polyglycidyl ethers of novolacs, polyepoxy compounds derived from aromatic amines and epichlorohydrin, and mixtures thereof.

26. A fiber resin matrix composite, for assembly into a structural member, as defined in claim 25, wherein said thermosetting resin composition (A) (ii) and said interleaf resin (B) both exhbit an ultimate shear stress above about 3000 psi.

27. A fiber resin matrix composite, for assembly into a structural member, as defined in claim 25, wherein said thermosetting resin composition further includes curing agent(s).

28. A fiber resin matrix composite, for assembly into a structural member, as defined in claim 27, wherein said curing agents are diamines.

29. A fiber resin matrix composite, for assembly into a structural member, as defined in claim 28, wherein said diamines are selected from the group consisting of diaminodiphenyl sulphone, diaminodiphenyl methane, and phenylenediamine.

30. A fiber resin matrix composite, for assembly into a structural member, as defined in claim 22, wherein the interleaf resin is a polyether imide resin.

31. A fiber resin matrix composite, for assembly into a structural member, as defined in claim 22, wherein said reinforcing filaments comprise about 60%–70% by weight of the fiber resin matrix and said thermosetting resin composition (A) (ii) comprises about 30%–40% by weight of the fiber resin matrix.

32. A fiber resin matrix composite, for assembly into a structural member, is defined in claim 22, wherein said fiber resin matrix layer (A) has a thickness of approximately 0.007–0.009 in. and said interleaf resin layer (B) has a thickness of approximately 0.0004–0.001 in.

33. A fiber resin matrix composite, for assembly into a structural member, as defined in claim 22, wherein said thermosetting resin composition comprises a resin selected from the group consisting of thermosetting epoxy, polymide, bis maleimide and acetylene-terminated resins.

34. A fiber resin matrix composite, for assembly into a structural member, as defined in claim 22, wherein said thermoplastic resin (B) (i) contains up to about 40 percent by weight of a thermosetting resin.

35. A fiber resin matrix composite, for assembly into a structural member, as defined in claim 22, wherein said thermoplastic resin (B) (i) contains a reinforcing material.

36. A fiber resin matrix composite, for asesmbly into a structural member, as defined in claim 22, wherein the thermosetting resin composition (A) (ii) is comprised of bis maleimide compounds selected from the group consisting of:

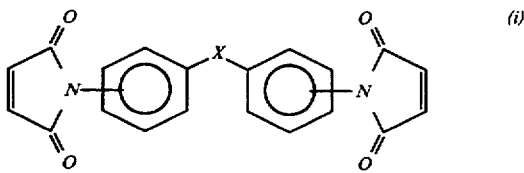

wherein
the isomeric species are meta, meta; meta, para or para, para and

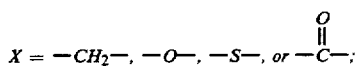

(ii)

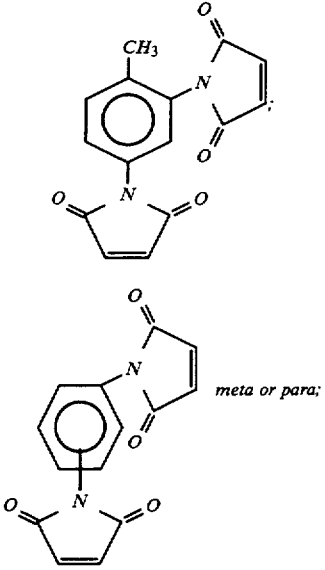

meta or para;

(iii)

(iv)

(v)

37. A fiber resin matrix composite, for assembly into a structural member, as defined in claim 22, wherein the thermosetting resin composition (A) (ii) is comprised of acetylene-terminated resins selected from the group consisting of:

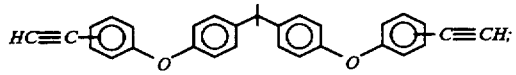 (i)

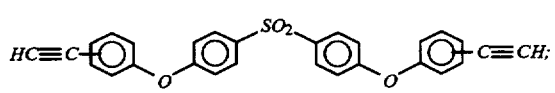 (ii)

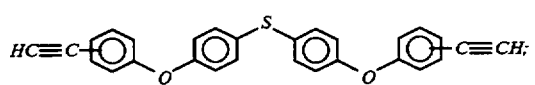 (ii)

and

-continued

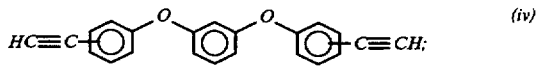 (iv)

wherein the —C≡CH substituents each independently may be meta-or para- positioned.

38. A fiber resin matrix composite for assembly into a multi-layered laminated structural member having enhanced compressive strength after impact upon curing, said composite comprising:

(A) a fiber resin matrix comprising:
  (i) 60%–70% by weight high-strength reinforcing filaments selected from the group consisting of carbon fibers, graphite fibers, nickel-coated such fibers, silver-coated such fibers, nickel-and-silver-coated such fibers, and combinations thereof; and
  (ii) 30%–40% by weight of a thermosetting epoxy resin composition coating said filaments, said epoxy resin composition comprising:
    (a) a polyepoxide compound or combination of compounds,
    (b) a curing agent effective to catalyze polymerization of said polyepoxide compound, and
    (c) a filler; and
(B) a discrete interleaf layer, having a maximum thickness of 0.001 inch, comprising: a thermoplastic resin, adhesively bondable to said fiber resin matrix layer, wherein said epoxy resin composition (A) (ii) exhibits shear modulus of at least 50,000 psi at high temperatures under wet conditions, and said interleaf resin (B) exhibits shear modulus of at least 50,000 psi and a yield strength of at least 3000 psi at high temperatures, and shear strain to failture of at least 6% at −67° F., at least 15% at room temperature and at least 25% at high temperatures, and wherein said interleaf resin (B) is selected from the group consisting of polyester, polyamide, polyaramid, polyarylate, polycarbonate, poly(ester carbonate), polybenzimidazole, polyimide, polyether imide, polyamide imide, polyether ether ketone, and mixtures of any of the foregoing.

39. A fiber resin matrix composite for assembly into a multi-layered laminated structural member having enhanced compressive strength after impact upon curing, said composite comrpsing:

(A) a fiber resin matrix layer comrising:
  (i) 60%–70% by weight high strength reinforcing filaments selected from the group consisting of carbon fibers, graphite fibers, nickel-coated such fibers, silver-coated such fibers and nickel-and-silver-coated such fibers, and
  (ii) 30%–40% by weight of a thermosetting epoxy resin compostion coating said filaments, said epoxy resin composition comprising:
    (a) 50–100 parts by weight of tetra(4,4')N-glycidyl methylene dianiline,
    (b) 0–50 parts by weight tetra-glycidoxy tetraphenylethane,
    (c) 28–60 parts by weight trimethylene glycol dipara-aminobenzoate,
    (d) 0–12 parts by weight fumed silica, and
    (e) 0.1–2.5 parts by weight of the reaction product of toluene diisocyanate and dimethylamine; and
(B) a discrete interleaf resin layer, having a maximum thickness of 0.001 inch, wherein said interleaf resin is selected from the group consisting of a thermoplastic polyether polyimide, polyester, polyamide, polyaramide, polyarylate, polycarbonate, poly(ester carbonate), polybenzimidazole, polyimid, polyether imide, polyamide imide, polyether ether ketone, and mixtures of any of the foregoing.

40. A fiber resin matrix composite for assembly into a multi-layered laminated structural member having enhanced compressive strength after impact upon curing, said composite comprising:

(A) a fiber resin matrix layer comprising (i) 60%-70% by weight high-strength reinforcing filaments and (ii) 30%-40% by weight of a thermosetting resin composition coating said filaments, and (B) a discrete interleaf resin layer, having a maximum thickness of 0.001 inch, comprising a thermoplastic resin adhesively bondable to said fiber resin matrix layer, wherein said thermosetting resin composition (A) (ii), subjected to shear forces at 200° F., has an ultimate stress of at least 5000 psi, and wherein said interleaf resin (B), subjected to shear at 200° F., has a yield stress of at least 4000 psi, and an ultimate stress of at least 5000 psi, and wherein said interleaf resin (B) is selected from the group consisting of polyester, polyamide, polyaramid, polyarylate, polycarbonate, poly(ester carbonate), polybenzimidazole, polyimide, polyether imide, polyamide imide, polyether ether ketone, and mixtures of any of the foregoing.

* * * * *